(12) United States Patent
Mobin et al.

(10) Patent No.: US 9,325,537 B2
(45) Date of Patent: Apr. 26, 2016

(54) SERDES PVT DETECTION AND CLOSED LOOP ADAPTATION

(71) Applicant: LSI Corporation, San Jose, CA (US)

(72) Inventors: Mohammad S. Mobin, Orefield, PA (US); Weiwei Mao, Macungie, PA (US); Chintan M. Desai, San Jose, CA (US); Freeman Y. Zhong, San Ramon, CA (US); Ye Liu, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 37 days.

(21) Appl. No.: 14/244,474

(22) Filed: Apr. 3, 2014

(65) Prior Publication Data

US 2015/0249555 A1 Sep. 3, 2015

Related U.S. Application Data

(60) Provisional application No. 61/945,989, filed on Feb. 28, 2014.

(51) Int. Cl.
*H04L 27/08* (2006.01)
*H04L 25/03* (2006.01)
*H04L 25/06* (2006.01)

(52) U.S. Cl.
CPC .......... *H04L 25/03057* (2013.01); *H04L 25/06* (2013.01)

(58) Field of Classification Search
CPC .. H04L 25/03057; H04L 25/06; H04L 25/061
See application file for complete search history.

(56) References Cited

U.S. PATENT DOCUMENTS

| | | | |
|---|---|---|---|
| 7,656,227 B1* | 2/2010 | Beaudoin | H03F 1/32 330/124 D |
| 7,696,800 B2* | 4/2010 | Azimi | H03K 5/02 327/108 |
| 8,004,345 B2* | 8/2011 | Ramamoorthy | H03K 19/018585 327/513 |
| 8,135,100 B2 | 3/2012 | Beukema et al. | |
| 8,139,700 B2* | 3/2012 | Beukema | H03K 5/15013 327/147 |
| 8,335,249 B1* | 12/2012 | Su | H04L 25/03878 375/232 |
| 8,411,703 B1* | 4/2013 | Cory | G06F 1/10 326/93 |
| 8,958,512 B1* | 2/2015 | Ding | H04L 25/03057 375/229 |
| 2006/0067440 A1* | 3/2006 | Hsu | H03F 1/3241 375/345 |
| 2007/0216454 A1* | 9/2007 | Fan | G11C 7/1072 327/149 |
| 2008/0137721 A1* | 6/2008 | Hsu | H04L 25/03343 375/231 |
| 2008/0191789 A1* | 8/2008 | Anidjar | G06F 1/3203 327/538 |
| 2010/0046683 A1* | 2/2010 | Beukema | H04L 7/0062 375/355 |
| 2010/0329326 A1* | 12/2010 | Aziz | H04L 25/03057 375/233 |
| 2013/0230092 A1* | 9/2013 | Prokop | H04L 25/03044 375/233 |
| 2013/0230093 A1* | 9/2013 | Aziz | H04L 25/03057 375/233 |
| 2014/0126625 A1* | 5/2014 | Lin | H04L 25/03057 375/233 |

* cited by examiner

*Primary Examiner* — Daniel Washburn
*Assistant Examiner* — Berhanu Tadese (57) ABSTRACT

In described embodiments, process, voltage, temperature (PVT) compensation in a serializer/deserializer (SerDes) device employs a closed loop adaptation compensation that is incorporated into the SerDes receiver adaptation process. A detection method, where the adapted decision feedback equalizer (DFE) target level (e.g., tap H0) is monitored, employs this DFE target level when implementing a closed loop variable gain amplifier adaptation. The DFE target level in conjunction with the VGA level is used to control the PVT setting to maintain target SerDes data path gain by detecting a PVT corner condition. The detected PVT corner condition is employed to generate a control signal to further adjust the LEQ and DFE data path differential pair gain as required by the PVT condition.

20 Claims, 6 Drawing Sheets

SERDES PVT DETECTION AND CLOSED LOOP ADAPTATION

CROSS-REFERENCE TO RELATED APPLICATIONS

This application claims the benefit of the filing date of U.S. provisional application No. 61/945,989, filed on Feb. 28, 2014, the teachings of which are incorporated herein by reference.

BACKGROUND OF THE INVENTION

A serializer/deserializer (SerDes) is commonly used in devices for high speed communications to convert data between serial and parallel interfaces in each transmit/receive direction. As in most types of communication receivers, SerDes devices employ amplification of received signals prior to equalization (e.g., in a linear equalizer (LEQ) and subsequent processing (e.g., Multiplexers (MUX) and decision feedback qualization (DFE)). Amplification is usually accomplished using a variable gain amplifier (VGA). Unfortunately, the VGA and other circuits implemented in a semiconductor technology/geometry are subject to performance variation due to process, voltage and temperature (process (P), voltage (V) (e.g., supply VDD) and temperature (T), collectively known as (PVT)) variations during operation. P, V, and T corners represent the extremes of these parameter variations, with the performance at fast (FFF) and slow (SSS) corners (along with T and V corners) often employed to characterize performance of a device under PVT variations.

As technology shrinks in geometry, the PVT variation is amplified. The PVT variation manifests itself as variations in circuit gain $$gm = \frac{\delta I_D}{\delta V_{GS}};$$

which can be represented in various forms, $$gm = \mu C_{ox} \frac{W}{L}(V_{GS} - V_{th}), \text{ or } gm = \frac{2I_D}{V_{GS} - V_{th}},$$

$$\text{where } I_D = \frac{1}{2}\mu_n C_{ox} \frac{W}{L}(V_{GS} - V_{th})^2.$$

The variations in W, L, $\mu$, $V_{gs}$, $V_{th}$ over PVT corners create variations in gm.

In a SerDes receive (Rx) data path, variations in VGA, LEQ, MUX, and DFE data path gains create an accumulated composite gain variation. In an exemplary SerDes receiver the gain variation approaches 20 dB. With such wide data path gain variation, the system bit error rate (BER) performance objectives are generally not met reliably. In case of a high gain corner (usually slow process, high VDD, low T corner) the signal is highly compressed and loses adaptation information, which in turn results in sub-optimal receiver operation. In case of a low gain corner (usually fast process, low VDD, high T corner) the signal cannot be amplified, and remain attenuated even at the highest VGA setting. As a result, the device cannot meet operating BER performance for low launch (low transmitter signal power) applications. An approach for a solution is compensation for PVT variation. One approach overdrives transistors with excessive current increase transistor gain gm. Increasing system power budget might help the fast gain corner reach sub-optimal operating performance at the expense of degrading the slow gain corner even more. In general, present SerDes device designs are optimized for PVT compensation using open loop PVT compensation circuits. In existing approaches, the SerDes device is designed for the worst case scenario that results in dissipating more power and consumes more area than might be required for typical application in the absence of PVT variations.

An eye pattern, also known as an eye diagram (the "eye"), represents a digital data signal from a receiver that is repetitively sampled and applied to the vertical input (axis), while the horizontal input (axis) represents time as a function of the data rate. The eye diagram allows for evaluation of the combined effects of channel noise and inter-symbol interference on the performance of a baseband pulse-transmission system, and the eye is the synchronized superposition of all possible realizations of the signal of interest viewed within a particular signaling interval.

When sampling the input signal, the data latch employed to make a decision for the data or symbol value is usually placed within the center of the eye. When a DFE is present, the first tap value H0 for the DFE is usually placed at an error location (usually at the top or bottom of the eye rails vertically from the data decision latch) and is adapted as part of the adaptive equalization process. In the context of evaluating PVT variation, similar H0 variation, or "spread" occurs as variations in process corners over all V and T corners. At the FFF process corner, the H0 level is relatively small, magnitude tends to be lower, and indicates poor gain in the FFF corner that dominates over V and T corners. On the other hand, at the SSS process corner, the H0 level is relatively large, magnitude tends to be higher, and indicates higher gain in SSS corner. In a conventional SerDes receiver, adaptation of DFE target level is within its set upper and lower limit. Anytime the target level is exceeded, the VGA is adaptively operated by varying its voltage regulator to pull in the DFE H0 value within the set upper and lower limit.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides for closed loop compensation in a receiver including a decision feedback equalizer (DFE). A composite data path gain of the receiver is detected, the data path including a variable gain amplifier (VGA), a linear equalizer (LEQ) and the DFE. A position of a main cursor tap value of the DFE is determined with respect to a target level to detect data path gain or attenuation. Effect of a process, voltage and temperature (PVT) condition is detected based on the determined position of the main cursor tap value against a present value of gain of the VGA when the present value of gain of the VGA is at a lowest or highest gain setting. The data path gain or attenuation is adjusted based on the detected PVT condition by adjusting a voltage regulator controlling the VGA gain; and the data path gain or attenuation is adjusted based on the detected PVT condition by adjusting a differential pair gain of the LEQ and DFE data path.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with described embodiments, process, voltage, temperature (PVT) compensation in a serializer/deserializer (SerDes) device employs a closed loop adaptation compensation that is incorporated into the SerDes receiver adaptation process. A PVT detection method, wherein the adapted decision feedback equalizer (DFE) target level (e.g., tap H0) is monitored, employs this DFE target level when implementing a closed loop variable gain amplifier adaptation. The DFE target level in conjunction with the VGA level is used to control the PVT setting to maintain target SerDes data path gain by detecting a PVT corner condition. The detected PVT corner condition is employed to generate a control signal to further adjust the LEQ and DFE data path differential pair gain as required by the PVT condition.

Figure 1:
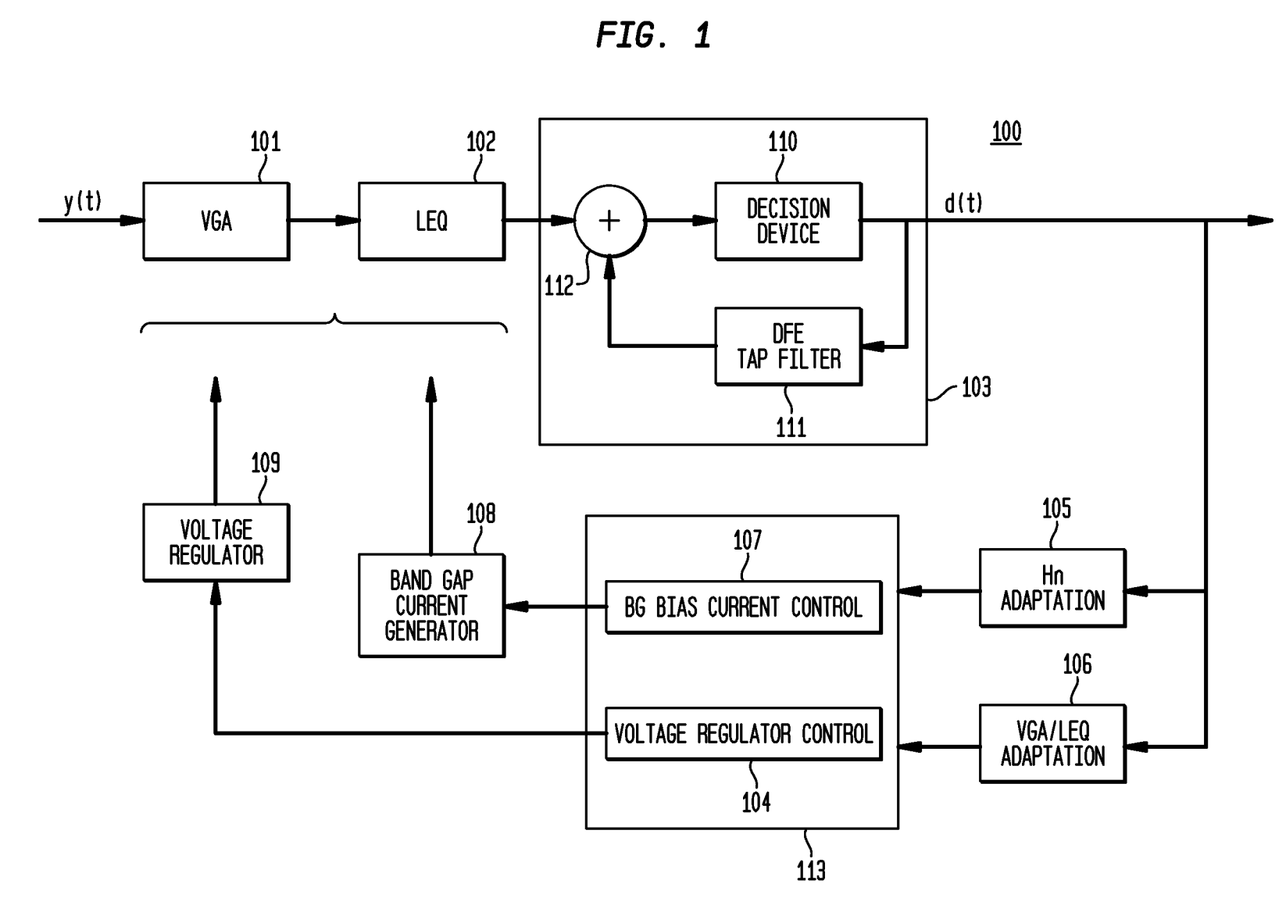
FIG. 1 shows a block diagram of a SerDes receiver incorporating closed loop PVT compensation in accordance with an exemplary embodiment.

FIG. 1 shows a block diagram of a SerDes receiver 100 incorporating closed loop PVT compensation in accordance with an exemplary embodiment. SerDes receiver 100 receives input signal y(t) from a channel. SerDes receiver 100 includes variable gain amplifier (VGA) 101, linear equalizer (LEQ), and decision feedback equalizer (DFE) 103. VGA 101 applies gain to input signal y(t), and LEQ 102 applies linear equalization to the gain adjusted input signal. At LEQ 102, the gain adjusted and equalized signal might be sampled for subsequent processing by DFE 103. DFE 103 includes decision device (e.g., slicer) 110 that generates output decisions d(t) corresponding to the input signal y(t). DFE 103 also includes DFE tap filter 111 and combiner 112 that applies equalization to the signal from LEQ 102 prior to slicing in a manner well known to one skilled in the art.

SerDes receiver 100 includes DFE tap (Hn) adaptation circuitry 105 and VGA/LEQ adaptation circuitry 106. Hn adaptation circuitry 105 and VGA/LEQ adaptation circuitry 106 each receive the present decision for d(t) and, based on the present decision and weighted versions of past decisions, adaptively set path gain, filter and equalizer parameters. Hn adaptation circuitry 105 is employed to adaptively adjust present DFE feedback tap values H0, H1, H2, . . . , HN in a manner well known to one skilled in the art. VGA/LEQ adaptation circuitry 106 is employed to adaptively adjust gain of VGA 101 and equalization parameters (or taps) of LEQ 102 in a similar manner well known to one skilled in the art.

SerDes receiver 100 further includes control circuitry 113, BG current generator 108, and voltage regulator 109. Control circuitry 113, which might be implemented as a simple processor or digital logic with related circuitry, includes band gap (BG) bias current control circuitry 107 and voltage regulator control circuitry 104. Control circuitry 113 might be employed to implement portions of the PVT compensation as described with respect to FIG. 4 subsequently.

BG bias current control circuitry 107 generates an output control signal that adjusts current generated by BG current generator 108. BG bias control circuitry 107 generates an output control signal based on the present output values of Hn adaptation circuitry 105 and VGA/LEQ adaptation circuitry 106 dependent upon the presently determined process corner. Current generated by BG current generator 108 is employed to set the range of gain of VGA 101 (i.e., VGA distribution), and might also be employed to set a path gain through LEQ 102.

Voltage regulator control circuitry 104 generates a VGA control signal (which might be implemented by simple table look-up and state-machine logic) to adjust DFE H0 (main cursor tap value) to target value based on the present state of outputs from Hn adaptation circuitry 105 and VGA/LEQ adaptation circuitry 106. Voltage regulator 109 is employed to generate, based on the VGA control signal, a voltage level signal to VGA 101 to set its value of gain or attenuation within its presently set range of gain.

Figure 2:
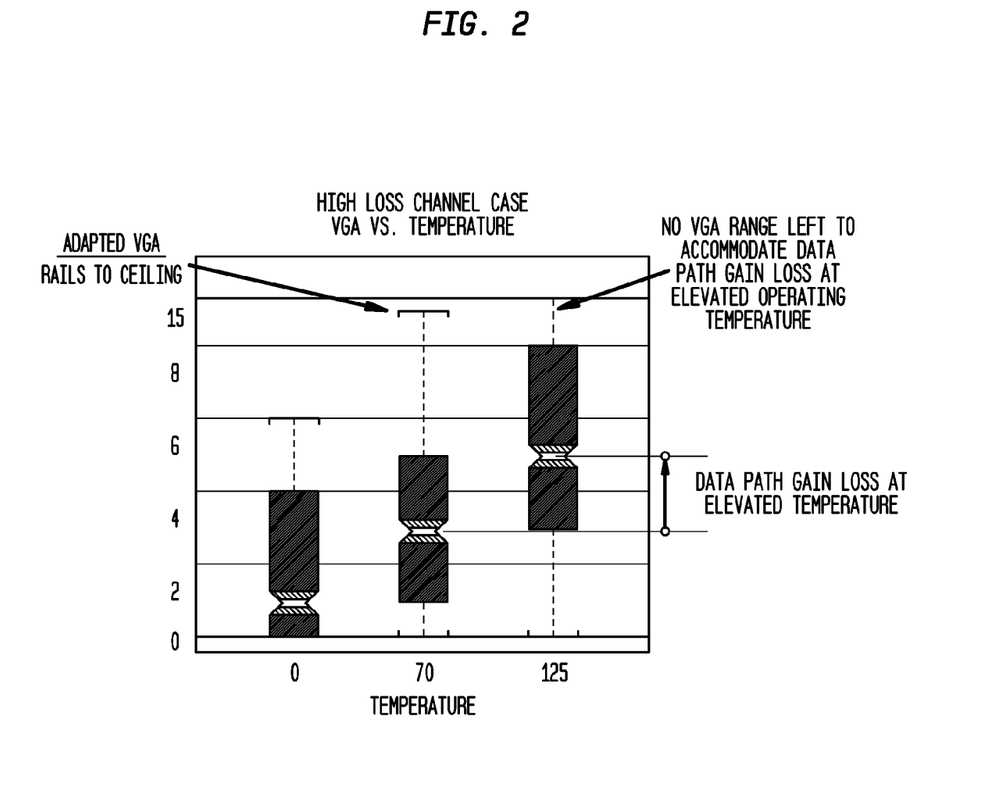
FIG. 2 illustrates VGA performance for high insertion loss and low transmit signal in the absence of PVT compensation for the receiver of FIG. 1.

FIG. 2 illustrates VGA performance for high insertion loss in the absence of PVT compensation for the receiver of FIG. 1 for VGA gain as a function of temperature (in degrees Celsius), with VGA distribution for H0 adaptation shown for each temperature case in a range of linear operation. A high insertion loss application is, for example, when the signal y(t) is severely attenuated when passing through a high loss channel. In a high insertion loss application, if VGA 101 has its gain adjusted to its highest setting (to the rails or saturation) after initial acquisition (shown at 70 C), then at steady state an elevated temperature operation of VGA 101 (shown at 125 C) has limited gain range left for device temperature compensation. As shown, if the VGA adjusts to its maximum after initial adaptation and the VGA distribution moves higher with increasing temperature; no further adjustment in VGA setting remains to overcome data path gain loss at elevated operating temperature. If the initial data eye margin was relatively low after acquisition, then at the elevated temperature the operating data eye margin might not meet or sustain system BER requirements.

Figure 3:
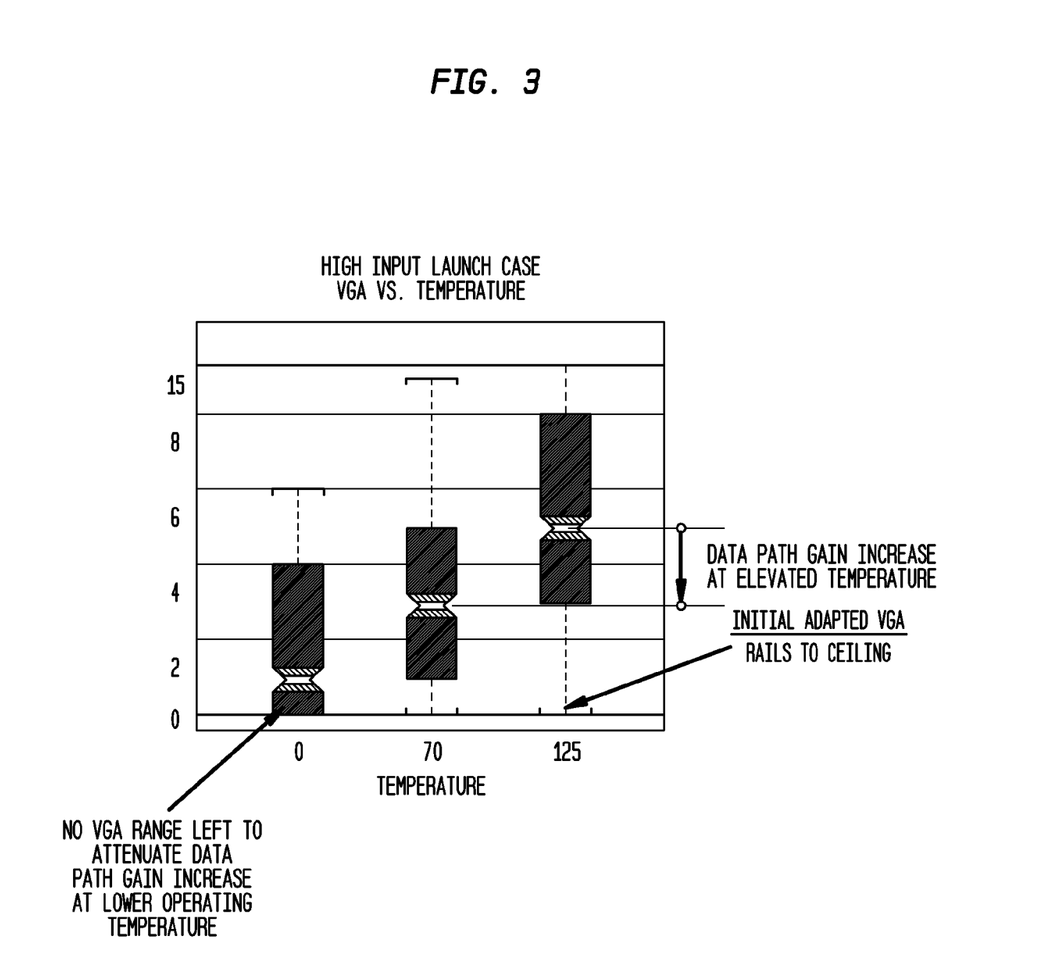
FIG. 3 illustrates VGA performance for low insertion loss or high transmit signal launch in the absence of PVT compensation for the receiver of FIG. 1.

FIG. 3 illustrates VGA performance for low insertion loss or high transmit signal launch in the absence of PVT compensation for the receiver of FIG. 1 for VGA gain as a function of temperature (in degrees Celsius), with VGA distribution for H0 adaptation shown for each temperature case as a range of linear operation. A low insertion loss application is, for example, when the signal y(t) experiences i) low attenuation when passing through the channel or ii) high transmitter launch (e.g., the transmitter provides signal y(t) to the channel at a high transmit power level). In a low insertion loss application, if VGA 101 has its gain adjusted to its lowest setting (to the rails or saturation) after initial acquisition (shown at 70 C), then at steady state a lower temperature operation of VGA 101 (shown at 0 C) does not have any attenuation range left to compensate for lower operating temperature. As shown, if the VGA adjusts to its lowest setting after initial adaptation and the VGA distribution moves lower with decreasing temperature, no further adjustment in VGA setting remains to overcome data path gain increases at reduced operating temperature. If an initially adapted VGA barely operates in the linear range of its compression curve, then, at a lower operating temperature, data path gain increases and signal amplitude increases. Due to lack of available VGA attenuation, the signal in the data path is compressed. Once the signal enters into a deep compression, any steady state or periodic adaptation drives equalizer parameters to non-optimal settings and data eye margin degrades. If the initial data eye margin was relatively low after acquisition, then additional data eye margin degradation in deep saturation might degrade system BER performance.

As described, the problem associated with the PVT gain spread can be algorithmically detected by monitoring the DFE H0 with respect to the DFE H0 target, as described subsequently with respect to FIG. 4. In cases when the data path has excessive gain the H0 target reaches its maximum limit even when the VGA offers the maximum attenuation. Excessive gain compresses the signal and results in sub optimal adaptation performance. A typical excessive data path gain scenario is demonstrated in following DFE H0 adaptation condition as shown and described subsequently with respect to FIG. 5.

In cases when the data path is gain starving, the DFE H0 cannot reach its set target value even though the VGA rails to its maximum value. When the VGA rails to its maximum value usually a loss of bandwidth occurs, which in turn attenuates the Nyquist frequency, and which nullifies the boost offered by the linear LEQ to a great extent. A typical gain starving data path behavior is seen from the adapted DFE H0 that cannot reach its set target value, as shown and described subsequently with respect to FIG. 6.

Figure 4:
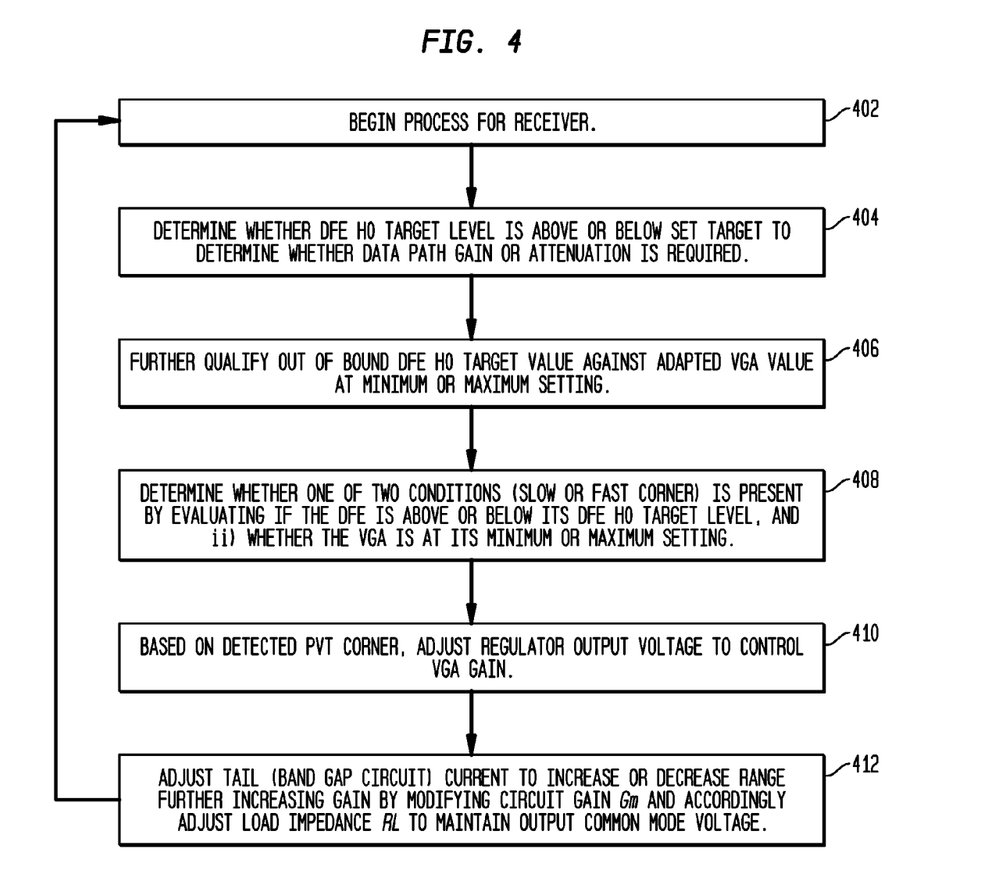
FIG. 4 is an exemplary method of closed loop PVT compensation for the receiver of FIG. 1.
Figure 5:
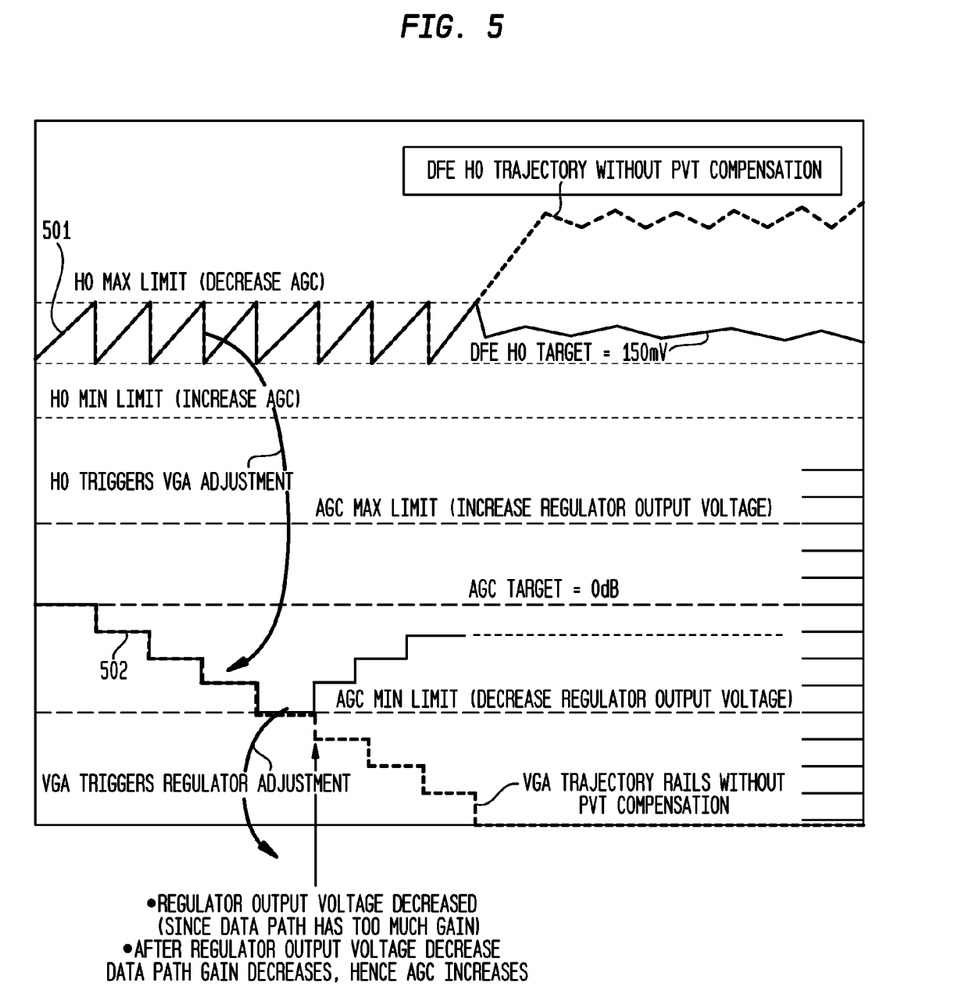
FIG. 5 illustrates a relationship between DFE target level adaptation and VGA operation for high insertion loss in the presence of PVT compensation for the receiver of FIG. 1.
Figure 6:
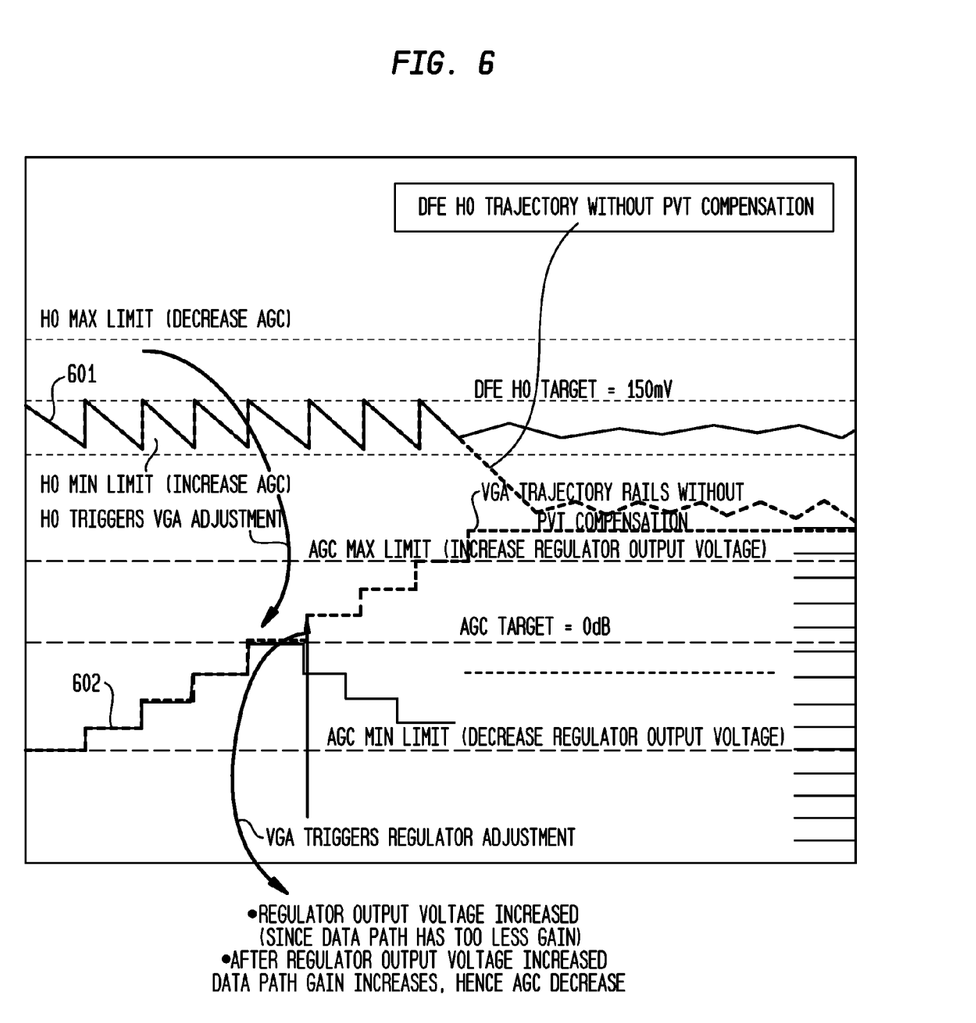
FIG. 6 illustrates a relationship between DFE target level adaptation and VGA operation for low insertion loss or high transmit signal launch in the presence of PVT compensation for the receiver of FIG. 1.

FIGS. 4, 5, and 6 illustrate an exemplary method of closed loop PVT compensation for the receiver of FIG. 1 and the relationship between the DFE H0 target level adaptation and VGA operation when the exemplary method is employed. Operation of the exemplary embodiment is now described with respect to FIGS. 4, 5, and 6.

FIG. 4 is an exemplary method of closed loop PVT compensation for the receiver of FIG. 1. At step 402, the process begins. At step 404, the DFE H0 target level is determined to be either above or below its set target to detect a need for data path gain or attenuation. At step 406, the out of bound DFE H0 target is further qualified against (its changing relationship determined with respect to) the adapted VGA value if the adapted VGA value is approaching its relative minimum or maximum setting for detection of the present PVT corner (i.e., high or low gain corner) condition. In other words, at step 406, the approach detects a PVT (e.g., high or low gain corner) condition exists or soon will be reached and that PVT compensation is desired.

At step 408, a test determines whether one of two conditions is present by evaluating if the DFE is above or below its H0 target level, and ii) whether the VGA has reached its minimum or maximum setting. If DFE H0 target level is above its preset target value and the VGA reaches its lowest setting, a high gain corner condition is detected. If DFE H0 target level is below its preset target and the VGA reaches its maximum setting, a low gain corner condition is detected.

At step 410, the detected PVT corner condition is employed to adjust the regulator output voltage setting to control the VGA gain. At step 412, the detected PVT corner condition is employed to generate a control signal to further adjust the LEQ and DFE data path differential pair gain as required by the PVT condition. At step 412, tail (band gap circuit) current is adjusted to modify circuit gain Gm and accordingly adjust load impedance Rl to maintain output common mode voltage. In a high gain corner condition, embodiments might decrease tail current to decrease circuit Gm and increase the load impedance Rl to maintain the output common mode voltage. In a low gain corner condition, embodiments might increase tail current to increase circuit Gm and decease the load impedance RL to maintain output common mode voltage. From step 412, the method returns to step 402.

FIG. 5 illustrates a relationship between DFE target level adaptation and VGA operation for high insertion loss in the presence of PVT compensation for the receiver of FIG. 1, as viewed over time, when the method of FIG. 4 is employed for a first exemplary process corner. DFE H0 target for this example is 150 mV, and is permitted to vary between a maximum and a minimum limit, where AGC is decreased and increased, respectively as these limits are reached. Trace 501 illustrates the value of H0 as AGC is varied, while trace 502 illustrates the value of the voltage regulator controlling gain or attenuation by the VGA.

The first exemplary process corner, as described above, usually exhibits excessive data path gain. As part of DFE H0 adaptation, the VGA is attenuated each time H0 exceeds the maximum limit, shown by the ramp up, drop down of characteristic of trace 501, and the corresponding step down characteristic of trace 502 showing a decrease in regulator voltage from the AGC target of 0 dB until a lower AGC min limit is reached. Consequently, the method of FIG. 4 introduces the constrained VGA qualified regulator output voltage and band gap bias current adaptation steps 406, 408, 410 and 412. The method of FIG. 4 sets a lower, preset limit of VGA gain. As the VGA attenuation advances to the present limit, the regulator voltage is decreased to reduce data path gain, and the VGA is stepped down to its floor level. When the regulator voltage reaches this lower predetermined setting, the band gap reference bias current is reduced. The method continues to reduce regulator voltage or band gap reference bias current until the VGA reaches its predetermined lower VGA attenuation limit. Since the method of adaptively adjusting regulator output voltage and band gap reference bias current is interleaved with VGA adaptation, the final VGA attenuation setting is adapted closer to its target level within the maximum and minimum (upper and lower) limits.

FIG. 6 illustrates a relationship between DFE target level adaptation and VGA operation for low insertion loss or high transmit signal launch in the presence of PVT compensation for the receiver of FIG. 1, as viewed over time, when the method of FIG. 4 is employed for a second exemplary process corner. In a second exemplary process corner the data path normally exhibits a minimum gain. As part of the DFE H0 adaptation, the VGA gain is increased every time the H0 drops below a lower limit, as shown by the ramp down, jump up of trace 601, and the corresponding step up characteristic of trace 502 showing an increase in regulator voltage from the AGC target of 0 dB until an upper AGC max limit is reached. As described previously during the conventional adaptation process, the VGA usually increases above an upper setting and eventually ceils to its maximum setting leaving no room for VGA adaptation as temperature increases from temperature during initial adaptation time. Consequently, the method of FIG. 4 introduces the constrained VGA qualified regulator output voltage and band gap bias current adaptation steps 406, 408, 410 and 412. The method of FIG. 4 sets a lower, preset limit of VGA gain. As part of the DFE H0 adaptation, the VGA gain is increased when H0 drops below a lower limit. If the VGA gain is increased beyond a preset limit, the regulator output voltage is increased to increase data path gain. After the regulator setting reaches an upper limit, the band gap bias current is increased. The method continues to increase the regulator output voltage or band gap bias current until the VGA comes out of a preset upper gain limit. Since the method of adaptively adjusting regulator output voltage and band gap reference bias current is interleaved with VGA adaptation, the final VGA attenuation setting is adapted closer to its target level within the maximum and minimum (upper and lower) limits.

A SerDes device employing closed loop PVT compensation in accordance with one or more embodiments provides for at least the following advantages. In the presence of either high insertion loss, low insertion loss, or high transmit signal launch and low transmit signal launch, data eye margin can be maintained within bounds for desired BER performance. While allowing for variations in PVT, the gain of an amplifier in the receive path can be maintained within its proper operating region without saturation to its rails. Further, DFE target level adaptation can occur within desired performance levels, thereby maintaining the DFE eye margins, over wide range of PVT variation. A SerDes device employing closed loop PVT compensation in accordance with one or more embodiments is not necessarily designed for a worst case scenario, and it dissipates less power and consumes less area than required for existing applications for the worst case scenario.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Further, the term "comprises or includes" and/or "comprising or including" used in the document means that one or more other components, steps, operation and/or existence or addition of elements are not excluded in addition to the described components, steps, operation and/or elements. Signals and corresponding nodes or ports may be referred to by the same name and are interchangeable for purposes here.

No claim element herein is to be construed under the provisions of 35 U.S.C. §112, sixth paragraph, unless the element is expressly recited using the phrase "means for" or "step for."

It is understood that various changes in the details, materials, and arrangements of the parts which have been described and illustrated in order to explain the nature of this invention may be made by those skilled in the art without departing from the scope of the embodiments of the invention as encompassed in the following claims.

We claim:

1. A method of closed loop compensation in a receiver including a decision feedback equalizer (DFE), the method comprising:
   detecting a composite data path gain of the receiver, the data path including a variable gain amplifier (VGA), a linear equalizer (LEQ) and the DFE;
   receiving a present decision from the data path at both a DFE tap adaptation circuitry and a VGA/LEO adaptation circuitry;
   based at least in part on the received present decision and further based on one or more past decisions of the data path, adaptively setting path gain, filter, and/or equalizer parameters with the DFE tap adaptation circuitry and VGA/LEQ adaptation circuitry;
   determining a position of a main cursor tap value of the DFE with respect to a target level to detect data path gain or attenuation;
   detecting effect of a process, voltage and temperature (PVT) condition based on the determined position of the main cursor tap value against a present value of gain of the VGA when the present value of gain of the VGA is at a lowest or highest gain setting;
   adjusting the data path gain or attenuation based on the detected PVT condition and the adaptively set path gain, filter, and/or equalizer parameters by adjusting a voltage regulator controlling the VGA gain; and
   adjusting the data path gain or attenuation based on the detected PVT condition and the adaptively set path gain, filter, and/or equalizer parameters by adjusting a differential pair gain of the LEQ and DFE data path.

2. The method of claim 1, wherein the detecting the PVT condition includes detecting a high gain corner condition.

3. The method of claim 2, wherein the high gain corner condition is detected when the position of the main cursor tap value of the DFE is above its target level and the present value of the gain of the VGA reaches its lowest gain setting.

4. The method of claim 2, wherein, when the detected PVT condition is the high gain corner condition, the adjusting a differential pair power of the LEQ and DFE data path includes:
   decreasing a tail current to decrease circuit gain Gm and increasing the load impedance RL to maintain output common mode voltage.

5. The method of claim 1, wherein the detecting the PVT condition includes detecting a low gain corner condition.

6. The method of claim 5, wherein the low gain corner condition is detected when the position of the main cursor tap value of the DFE is below its target level and the present value of the gain of the VGA reaches its highest gain setting.

7. The method of claim 5, wherein, when the detected PVT condition is the fast corner condition, the adjusting a differential pair power of the LEQ and DFE data path includes:
   increasing a tail current to increase circuit gain Gm and decreasing the load impedance RL to maintain output common mode voltage.

8. The method of claim 1, wherein the determining a position of the main cursor tap value of the DFE with respect to a target level determines a position of a tap of the DFE with the target level of the tap of the DFE.

9. The method of claim 1, wherein the method is implemented in a serializer/deserializer (SerDes) receiver.

10. An apparatus for closed loop compensation in a receiver including a decision feedback equalizer (DFE), the apparatus comprising:
    DFE tap adaptation circuitry and variable gain amplifier (VGA)/linear equalizer (LEQ) adaptation circuitry configured to
    receive a present decision from a data path of the receiver, the data path including a VGA, a LEQ and the DFE,
    wherein the DFE tap adaptation circuitry and the VGA/LEQ adaptation circuitry are further configured, based on the present decision and a weighted version of past decision from the data path, to adaptively set path gain, filter, and equalizer parameters; and
    control circuitry configured to receive outputs from the DFE tap adaptation circuitry and the VGA/LEQ adaptation circuitry and then:
      (i) determine a position of a main cursor tap value of the DFE with respect to a target level to detect data path gain or attenuation;
      (ii) detect effect of a process, voltage and temperature (PVT) condition based on the determined position of the main cursor tap value against a present value of gain of the VGA when the present value of gain of the VGA is at a lowest or highest gain setting;
      (iii) adjust the data path gain or attenuation based on the detected PVT condition and the adaptively set path gain, filter, and/or equalizer parameters by adjusting a voltage regulator controlling the VGA gain; and
      (iv) adjust the data path gain or attenuation based on the detected PVT condition and the adaptively set path gain, filter, and/or equalizer parameters by adjusting a differential pair gain of the LEQ and DFE data path.

11. The apparatus of claim 10, wherein the control circuitry detects a high gain corner condition as the detected PVT condition.

12. The apparatus of claim 11, wherein the high gain corner condition is detected when the position of the main cursor tap value of the DFE is above its target level and the present value of the gain of the VGA reaches its lowest gain setting.

13. The apparatus of claim 11, wherein, when the detected PVT condition is the high gain corner condition, the control circuitry adjusts a differential pair power of the LEQ and DFE data path by:
    decreasing a tail current to decrease circuit gain Gm and increasing the load impedance RL to maintain output common mode voltage.

14. The apparatus of claim 10, wherein the control circuitry detects a low gain corner condition as the detected PVT condition.

15. The apparatus of claim 14, wherein the low gain corner condition is detected when the position of the main cursor tap value of the DFE is below its target level and the present value of the gain of the VGA reaches its highest gain setting.

16. The apparatus of claim 14, wherein, when the detected PVT condition is the fast corner condition, the control circuitry adjusts a differential pair power of the LEQ and DFE data path by:

increasing a tail current to increase circuit gain Gm and decreasing the load impedance RL to maintain output common mode voltage.

17. The apparatus of claim 10, wherein the control circuitry determines a position of the main cursor tap value of the DFE with respect to a target level determines a position of a tap of the DFE with the target level of the tap of the DFE.

18. The apparatus of claim 10, wherein the apparatus is implemented in a serializer/deserializer (SerDes) receiver.

19. The apparatus of claim 18, wherein the serializer/deserializer (SerDes) receiver is implemented in an integrated circuit (IC).

20. A non-transitory machine-readable storage medium, having encoded thereon program code, wherein, when the program code is executed by a machine, the machine implements a method for closed loop compensation in a receiver including a decision feedback equalizer (DFE), comprising the steps of:

detecting a composite data path gain of the receiver, the data path including a variable gain amplifier (VGA), a linear equalizer (LEQ) and the DFE;

receiving a present decision from the data path at both a DFE tap adaptation circuitry and a VG/LEQ adaptation circuitry;

based at east in part on the received present decision and further based on one or more past decisions of the data path, adaptively setting path gain, filter, and/or equalizer parameters with the DFE tap adaptation circuitry and VGA/LEQ adaptation circuitry;

determining a position of a main cursor tap value of the DFE with respect to a target level to detect data path gain or attenuation;

detecting effect of a process, voltage and temperature (PVT) condition based on the determined position of the main cursor tap value against a present value of gain of the VGA when the present value of gain of the VGA is at a lowest or highest gain setting;

adjusting the data path gain or attenuation based on the detected PVT condition and the adaptively set path gain, filter, and/or equalizer parameters by adjusting a voltage regulator controlling the VGA gain; and     adjusting the data path gain or attenuation based on the detected PVT condition and the adaptively set path gain, filter, and/or equalizer parameters by adjusting a differential pair gain of the LEQ and DFE data path.

* * * * *